US008180812B2

(12) United States Patent  
Battepati et al.

(10) Patent No.: US 8,180,812 B2
(45) Date of Patent: May 15, 2012

(54) TEMPLATES FOR CONFIGURING FILE SHARES

(75) Inventors: Roopesh C. Battepati, Sammamish, WA (US); Michael C. Johnson, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 371 days.

(21) Appl. No.: 12/437,560

(22) Filed: May 8, 2009

(65) Prior Publication Data

US 2010/0287221 A1 Nov. 11, 2010

(51) Int. Cl.
*G06F 17/30* (2006.01)
(52) U.S. Cl. ....................................................... 707/827
(58) Field of Classification Search .................. 707/821, 707/822, 827
See application file for complete search history.

(56) References Cited

U.S. PATENT DOCUMENTS

| | | | |
|---|---|---|---|
| 6,618,736 B1 | 9/2003 | Menage | |
| 7,328,225 B1 | 2/2008 | Beloussov et al. | |
| 2003/0145041 A1* | 7/2003 | Dunham et al. | 709/203 |
| 2005/0223024 A1 | 10/2005 | Hyun et al. | |
| 2005/0283441 A1* | 12/2005 | Deshpande et al. | 705/64 |
| 2006/0235863 A1 | 10/2006 | Khan | |
| 2007/0136578 A1* | 6/2007 | Dubhashi et al. | 713/167 |
| 2008/0201617 A1 | 8/2008 | Ohara et al. | |
| 2009/0024931 A1 | 1/2009 | Bae | |
| 2009/0112789 A1* | 4/2009 | Oliveira et al. | 707/1 |

OTHER PUBLICATIONS

Posey Brien, "Managing Windows Server 2008 Disk Quotas", Retrieved at<<http://www.petri.co.il/managing-windows-server-2008-disk-quotas.htm>>, Jan. 8, 2009, pp. 3.
"Oracle WebLogic Server", Retrieved at<<http://e-docs.bea.com/common/docs103/pdf/tempref.pdf>>, 10g Release 3 (10.1.3), Aug. 2008, pp. 62.
Barreto Jose, "The Basics of Windows Server 2008 FSRM (File Server Resource Manager", Retrieved at<<http://blogs.technet.com/josebda/archive/2008/08/20/the-basics-of-windows-server-2008-fsrm-file-server-resource-manager.aspx>>, pp. 17.
"Predefined Security Templates", Retrieved at<<http://technet.microsoft.com/en-us/library/cc787720.aspx>>, Jan. 21, 2005, pp. 4.

* cited by examiner

*Primary Examiner* — Thu-Nguyet Le
(74) *Attorney, Agent, or Firm* — Zete Law, P.L.L.C.; MacLane C. Key

(57) ABSTRACT

Aspects of the subject matter described herein relate to configuring file shares. In aspects, a template is created that includes policies to apply to one or more shares. The template may derive or otherwise obtain policies from other templates and may also refer to other templates. The template may include opaque data to pass to a subsystem that configures a share with a policy corresponding to the data. After the template is created, the template may then be applied to one or more shares to configure the shares according to policies included in the template. When the template or any template upon which the template depends or to which the template refers is changed, shares associated with the template may also be automatically changed as appropriate.

20 Claims, 6 Drawing Sheets

TEMPLATES FOR CONFIGURING FILE SHARES

BACKGROUND

When creating new file shares, a system administrator, user, or the like has a number of tasks to perform and several pieces of information to supply in order to correctly configure a file share with all the desired attributes, such as file system path, remote file system access protocols, share level permissions and file system directory level permissions for one or more individuals or lists of users. In some cases, additional configuration may be involved for file system quota, file screening, or other related systems.

Ensuring that the configurations are done is time consuming and error prone, particularly when the same configurations may need to be applied to many similar file shares across many individual (or clustered) file servers.

The subject matter claimed herein is not limited to embodiments that solve any disadvantages or that operate only in environments such as those described above. Rather, this background is provided to illustrate one exemplary technology area where some embodiments described herein may be practiced.

SUMMARY

Briefly, aspects of the subject matter described herein relate to configuring file shares. In aspects, a template is created that includes policies to apply to one or more shares. The template may derive or otherwise obtain policies from other templates and may also refer to other templates. The template may include opaque data to pass to a subsystem that configures a share with a policy corresponding to the data. After the template is created, the template may then be applied to one or more shares to configure the shares according to policies included in the template. When the template or any template upon which the template depends or to which the template refers is changed, shares associated with the template may also be automatically changed as appropriate.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" is to be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Definitions

As used herein, the term "includes" and its variants are to be read as open-ended terms that mean "includes, but is not limited to." The term "or" is to be read as "and/or" unless the context clearly dictates otherwise. The term "based on" is to be read as "based at least in part on." Other definitions, explicit and implicit, may be included below.

Exemplary Operating Environment

Figure 1:
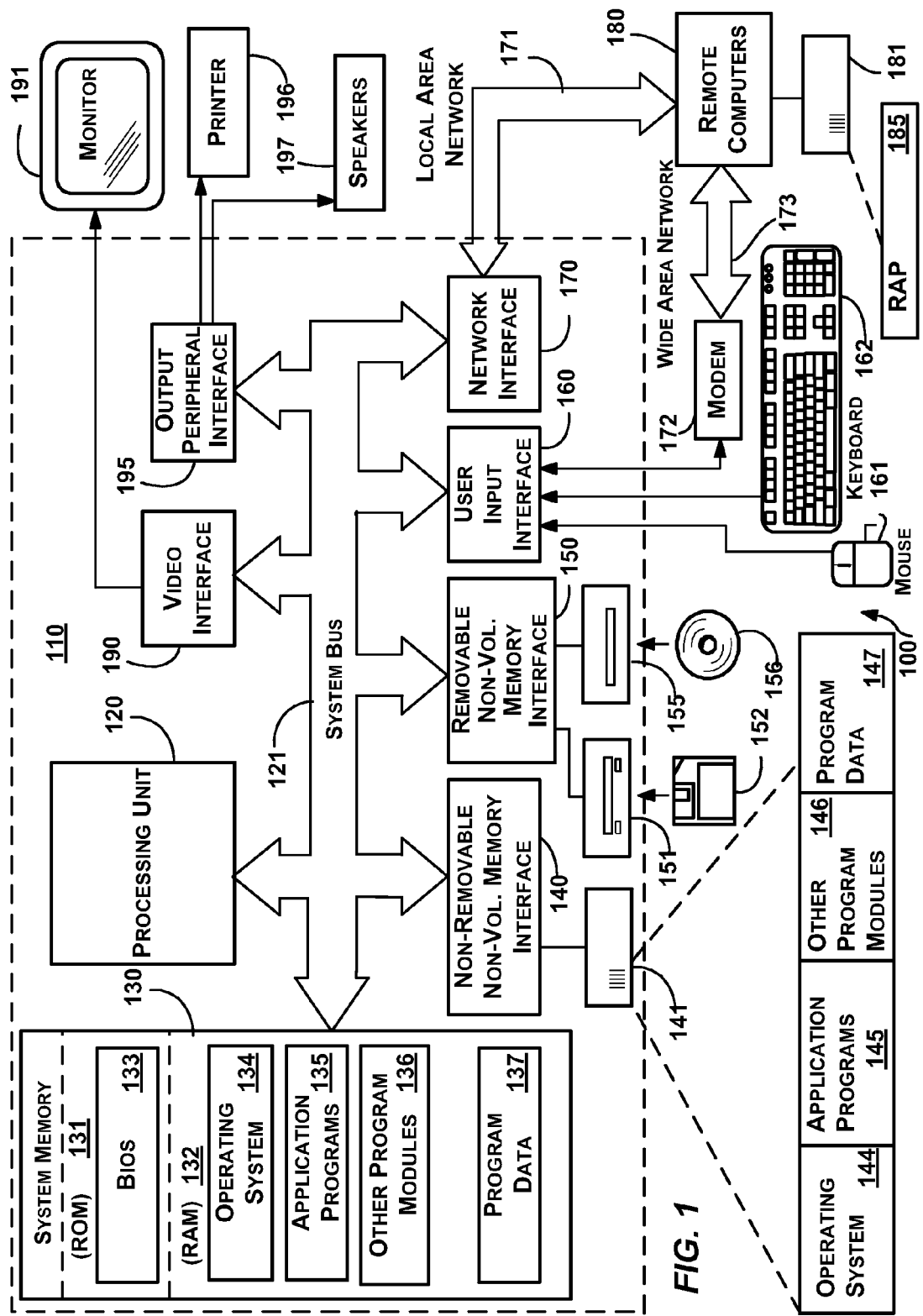
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well known computing systems, environments, or configurations that may be suitable for use with aspects of the subject matter described herein comprise personal computers, server computers, hand-held or laptop devices, multiprocessor systems, microcontroller-based systems, set-top boxes, programmable consumer electronics, network PCs, minicomputers, mainframe computers, personal digital assistants (PDAs), gaming devices, printers, appliances including set-top, media center, or other appliances, automobile-embedded or attached computing devices, other mobile devices, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. A computer may include any electronic device that is capable of executing an instruction. Components of the computer 110 may include a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media.

Computer storage media includes both volatile and nonvolatile, removable and non-removable media implemented in any method or technology for storage of information such as computer-readable instructions, data structures, program modules, or other data. Computer storage media includes RAM, ROM, EEPROM, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include magnetic tape cassettes, flash memory cards, digital versatile discs, other optical discs, digital video tape, solid state RAM, solid state ROM, and the like. The hard disk drive 141 is typically connected to the system bus 121 through a non-removable memory interface such as interface 140, and magnetic disk drive 151 and optical disc drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies.

A user may enter commands and information into the computer 20 through input devices such as a keyboard 162 and pointing device 161, commonly referred to as a mouse, trackball, or touch pad. Other input devices (not shown) may include a microphone, joystick, game pad, satellite dish, scanner, a touch-sensitive screen, a writing tablet, or the like. These and other input devices are often connected to the processing unit 120 through a user input interface 160 that is coupled to the system bus, but may be connected by other interface and bus structures, such as a parallel port, game port or a universal serial bus (USB).

A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Templates

Figure 2:
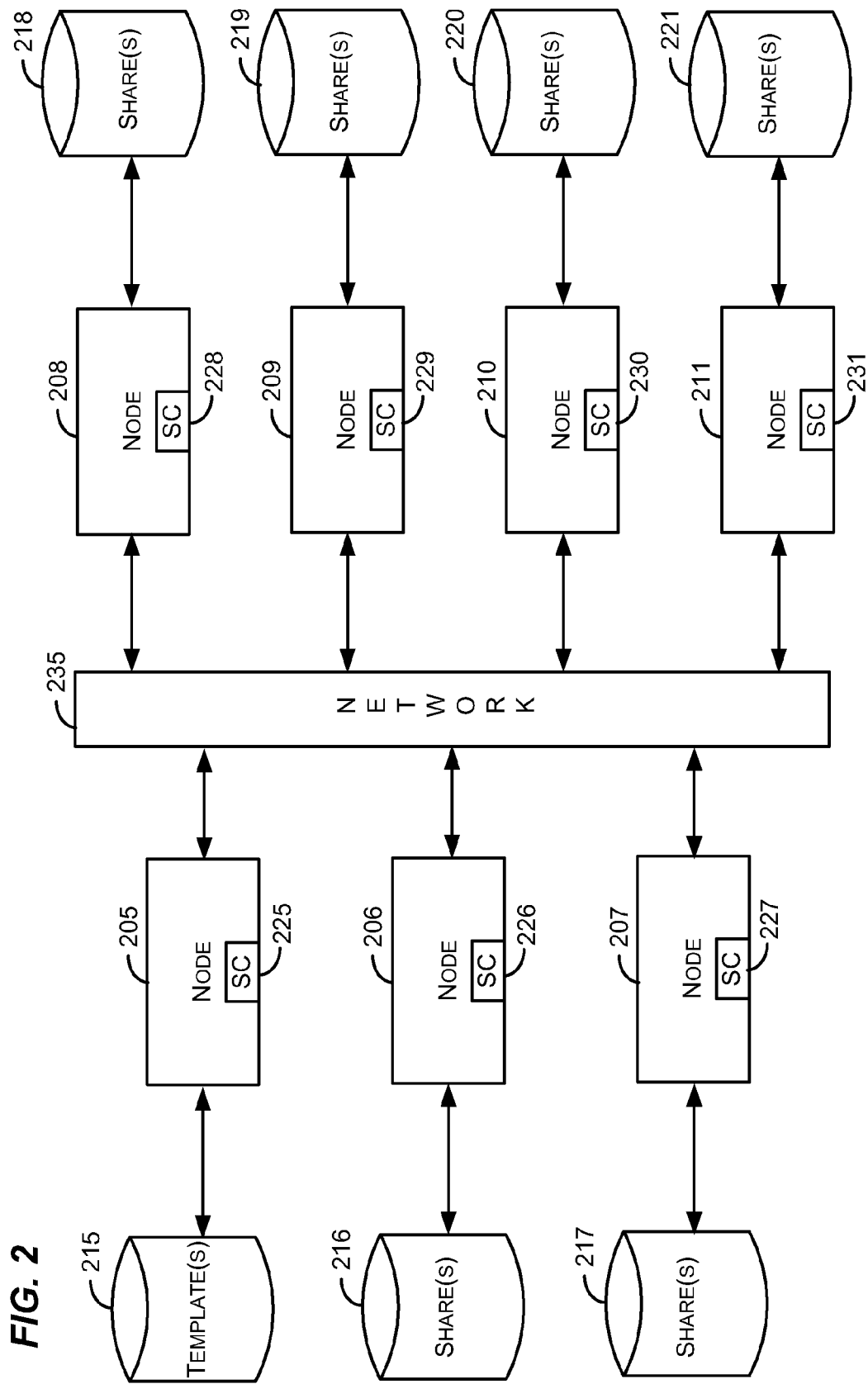
FIG. 2 is a block diagram representing an exemplary environment in which aspects of the subject matter described herein may be implemented.

As mentioned previously, configuring file shares may be tedious and error prone. FIG. 2 is a block diagram representing an exemplary environment in which aspects of the subject matter described herein may be implemented. The environment may include various nodes 205-211, stores 215-221, a network 235, and may include other entities (not shown). The nodes 205-211 may include share components 225-231. The various entities may be located relatively close to each other or may be distributed across the world. The various entities may communicate with each other via various networks including intra- and inter-office networks and the network 235.

In an embodiment, the network 235 may comprise the Internet. In an embodiment, the network 235 may comprise one or more local area networks, wide area networks, direct connections, virtual connections, private networks, virtual private networks, some combination of the above, and the like.

Each of the nodes 205-211 may comprise or reside on one or more computing devices. Such devices may include, for example, personal computers, server computers, hand-held or laptop devices, multiprocessor systems, microcontroller-based systems, set-top boxes, programmable consumer electronics, network PCs, minicomputers, mainframe computers, cell phones, personal digital assistants (PDAs), gaming devices, printers, appliances including set-top, media center, or other appliances, automobile-embedded or attached computing devices, other mobile devices, distributed computing environments that include any of the above systems or devices, and the like. An exemplary device that may be configured to act as a node comprises the computer 110 of FIG. 1.

The nodes 206-211 may provide access to share(s) on their associated stores 216-221, respectively.

The stores 215-221 comprise any storage media capable of storing data. The term data is to be read broadly to include anything that may be operated on by a computer. Some examples of data include information, program code, program state, program data, other data, and the like. A store may comprise a file system, database, volatile memory such as RAM, other storage, some combination of the above, and the like and may be distributed across multiple devices. A store may be external, internal, or include components that are both internal and external to the node to which the store is associated.

The store 215 may include one or more template(s) as well as other configuration information usable to apply the templates to one or more shares on the shares 216-221. Each of the stores 216-221 may include one or more shares. A template may include a collection of one or more policies that are to be applied to or maintained for one or more shares. A template may be associated with a logical share. A logical share is a conceptual share that has not been instantiated into an actual physical share on a store. What may be included in a template and the other configuration information is described in more detail below.

The share components 225 may communicate with the share components 226-231 to configure and provide information about shares on the stores 216-221. As used herein, the term component is to be read to include all or a portion of a device, one or more software components executing on one or more devices, some combination of one or more software components and one or more devices, and the like.

Figure 3:
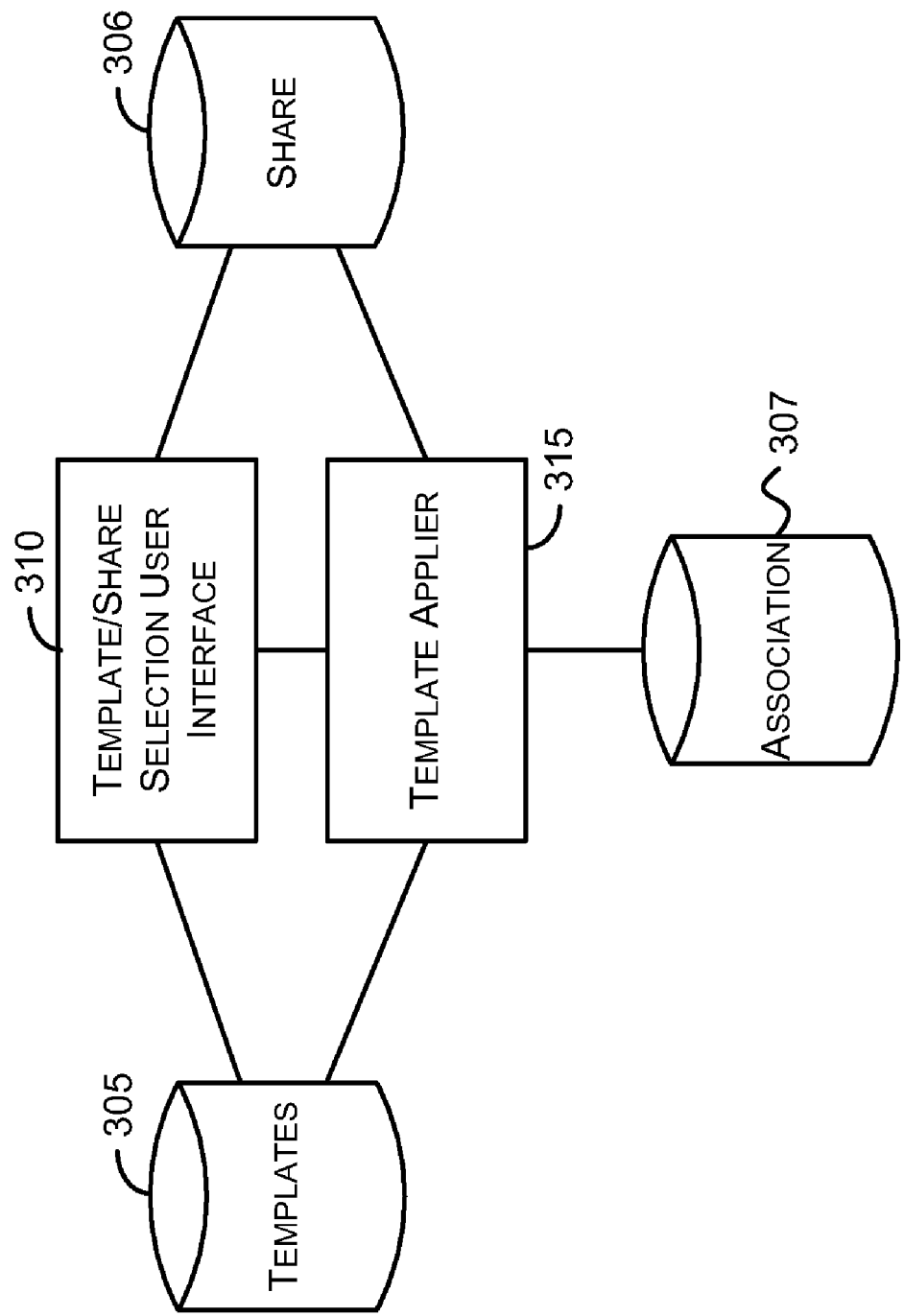
FIG. 3 is a block diagram representing an exemplary environment used to configure a share using one or more templates in accordance with aspects of the subject matter described herein.

FIG. 3 is a block diagram representing an exemplary environment used to configure a share using one or more templates in accordance with aspects of the subject matter described herein. The environment may include stores 305-307, a user interface 310, a template applier 315, and may include other entities (not shown). The templates in the store 305 correspond to the templates stored on the store 215 of FIG. 2. The user interface 310 and template applier 315 correspond to some share components that may reside on the node 205 of FIG. 2. The store 306 includes other information that may be needed to configure or maintain policies on a share. The store 307 corresponds to one of the stores 216-221 of FIG. 2. The stores 305-307, user interface 310, and template applier 315 are sometimes referred to herein as entities.

The various entities may be located relatively close to each other or may be distributed across the world. The entities may communicate with each other via various networks including one or more local area networks, wide area networks, direct connections, virtual connections, private networks, virtual private networks, some combination of the above, and the like.

Each of the entities 205-207, 210, and 215 may comprise, reside on, or be associated with one or more computing devices. In some embodiments, two or more of the entities 205-207, 210, and 215 may reside on or be associated with a single computing device. Such devices may include, for example, the devices suitable to implement a node as described in conjunction with FIG. 2.

The stores 305-307 comprise any storage media capable of storing data. A store may be external, internal, or include components that are both internal and external to a computing device to which the store is associated.

In one embodiment, the store 305 may comprise a single store. In another embodiment, the store 305 may comprise multiple stores and templates stored on the store 305 may be distributed across the multiple stores. Similarly, in one embodiment, the store 306 may comprise a single store while in other embodiments, the store 306 may comprise multiple stores and shares residing on the store 306 may be distributed across the multiple stores.

The store 307 may include information about templates and the shares. For example, the store 307 may include information (e.g., a table) that associates templates with shares. For example, this information may indicate machines, domains, networks, users, offices, locations, and the like that are associated with templates or shares. The information may indicate where templates have been applied, shares upon which templates are being used to maintain policies, where templates are going to be applied, and so forth. In some embodiments, the store 307 may be included as part of the store 305.

In one embodiment, an association between a share and a template may be "discovered." For example, a share that is associated with certain policies may be said to have a "signature." A signature may indicate a set of policies that are applied to a particular share. Signatures that are discovered on shares may be compared with signatures of templates to determine if any of the signatures of the templates match the signature of the shares. If a match is found, the share may be "discovered" to match the template and information regarding this match may be stored in the store 307. This may be useful, for example, in maintaining the shares in accordance with policies in their associated templates.

Templates stored in the store 305 may be organized in tables, records, objects, other data structures, and the like. Templates may be stored in HTML files, XML files, spreadsheets, flat files, document files, and other files. Templates may be stored in a structured format of a database of one type or another. For example, templates stored on the store 215 may be part of a relational database, object-oriented database, hierarchical database, network database, other type of database, some combination or extension of the above, and the like.

Data in a database may be accessed via components of a database management system (DBMS). A DBMS may comprise one or more programs that control organization, storage, management, and retrieval of data in a database. A DBMS may receive requests to access data in the database and may perform the operations needed to provide this access. Access as used herein may include reading data, writing data, deleting data, updating data, a combination including one or more of the above, and the like.

In describing aspects of the subject matter described herein, for simplicity, terminology associated with relational databases is sometimes used herein. Although relational database terminology is sometimes used herein, the teachings herein may also be applied to other types of databases including those that have been mentioned previously. As used herein, a record is to be read broadly as to include any data that may be included in a database of any type. For example, in a relational database, a record may comprise a row of a table.

In one embodiment, a template includes one or more policies that are to be applied to and/or maintained in conjunction with a file share. Policies may be indicated via properties. A template may be associated with an identifier that identifies the template. A property of a template may include simple values such as ShareName or SharePath strings, may include multiple or complex data values, may include a reference to another template, or the like. For example a security template may include a list of security attributes (e.g., an access control list). A share template may then refer to a predefined security template and avoid including the list of security attributes as part of the share template.

A template may include data or policies that are to be passed to other components in order to configure their actions. These data or policies may have no meaning to the template applier 315 except that the template applier 315 may know that it is to pass the data or policy to one or more other components. For example, a file screening policy template might contain opaque data which has meaning only to a file screening sub-system which can interpret the opaque data in order to configure the file screening policy to be applied to the consumer of that template.

A template may have properties that determine how it can be used. For example, a template for a share to store design specifications may have a security attribute that allows it to be used only by administrator or other person or persons responsible for publishing design specifications but not to be used by normal end users. As another example, a standard user share template may have a security attribute that allows it to be applied by any user but only on a machine where that user had access rights.

The values associated with template properties, whether they are simple, references to other templates, or otherwise, may have one or more properties affecting how they are to be used. For example, a value may be blank and may or may not need a suitable value to be supplied when the template is used. As another example, a template may provide an editable default value or a pre-determined fixed value. For example, a template describing a standard user temporary share may have an editable name defaulted to "Temporary" but also have a pre-defined set of security attributes that are fixed and unchangeable by the user applying the template.

In one embodiment, users that seek to create shares may be constrained to use one of a set of one or more pre-defined template. These pre-defined templates may be configured by a system administrator or the like and may be stored in a location that the user can read but not write to, for example. This template may include various policies that an organization seeks to enforce on privately-created shares. For example, the template may define certain access rights, file screening policies (e.g., to prevent unauthorized content), network access protocols, and so forth for the share. The security of the share may be applied based on the user that applies the template to the share.

In one embodiment, properties may be defined to be applied only at the time of the consumption of the template containing the properties. In another embodiment, when a template is updated or any template, data, or policy to which a template refers is updated, shares created using the template may be modified in accordance with the update(s). For example, a share template may have a property referencing a document retention policy template. If the retention policy changes, shares created using the share template may have their document retention policy updated to match that of the change in the retention policy in the document retention template.

Templates may be combined in a variety of ways including intersections, unions, other set operators, and the like. For example, one share template may reference a union of network protocol templates where each of the network protocol templates describe individual network file sharing protocols such as server message block (SMB) network file system (NFS), other file sharing protocols, and the like.

Templates may be derived from one or more other templates and may be constrained in conjunction with derivation. For example, a template may be derived from two templates that are associated with different sets of users. Deriving from two or more other templates may involve a union, intersection, a union of some properties and an intersection of other properties, some combination of the above, or the like of the properties of the two or more templates. Constraining may involve indicating that the derived template be applied to only certain users, machines, shares, or the like.

When combining two or more templates, a property in one template may conflict with a property in another template. For example, one template may indicate a file quota of one gigabyte while another template may indicate a file quota of two gigabytes. To resolve these conflicts, a tool may be provided that identifies and resolves conflicts. In one embodiment, the tool may resolve conflicts automatically based on priority, least/most restrictive practices, some other algorithm, and the like. In another embodiment, the tool may resolve identified conflicts based strictly on user input. In yet another embodiment, the tool may resolve some conflicts automatically while resolving other conflicts based on user input.

When a template is applied to an existing share, conflicts may also occur. For example, an existing share may be set with a one gigabyte quota while a template may indicate that the share is to have a two gigabyte quota. In this case, different mechanisms may be used to resolve the conflict. For example, in one embodiment, the policies specified in the template may override any policies specified on the share. In another embodiment, policies already existing on a share that have been manually set by an administrator may override any contrary policies specified by the template. In yet other embodiments, some policies in the template may be specified as overriding contrary policies on a share while other policies in the template may be specified as not overriding contrary policies on the share.

A template may be associated with one or more users that are in zero or more groups. To merge multiple templates where each template is associated with zero or more users, a template may be defined that combines properties of the multiple templates, retains properties of one or more of the of the templates while discarding properties of the other templates, or some other combination/discarding of the properties as desired. After the template has been defined it may be applied to one or more shares to provide access to users associated with the original templates. This may be useful, for example, when a branch office is closed and users moved to another existing office.

A template may include directory structure information that is to be applied to one or more machines. When the template is applied to a machine, if the directory structure does not exist or has been modified, the directory structure specified by the template may be created or re-established on the machine. The directory structure may include one or more shares. In conjunction with creating or re-establishing the directory structure, policies in the template may be applied to file system objects (e.g., files and directories) within the directory structure.

Some exemplary properties of a template that may be applied to a file share and its content include:

Share name
Applicable network protocols and versions
Share level security (e.g., read-only)
Share level attributes (e.g., visibility)
File system location (e.g., path)
File system attributes (e.g., compression)
Directory level ownership
Directory level security
File system quota policies (e.g., per-user, per-directory, per sub-directory)
Distributed file system namespace location
Distributed file system replication policies
File screening policies
Anti-virus scanning policies
Backup policies
Data retention policies
Hierarchical storage policies
Volume management attributes (e.g. free space alarms, data redundancy)
Indexing policies The above list of properties is not intended to be all-inclusive or exhaustive. Indeed, based on the teachings herein, those skilled in the art may recognize many other policies that may be applied using the techniques described herein without departing from the spirit or scope of aspects of the subject matter described herein.

Although the environments described above includes various numbers of the entities and related infrastructure, it will be recognized that more, fewer, or a different combination of these entities and others may be employed without departing from the spirit or scope of aspects of the subject matter described herein. Furthermore, the entities and communication networks included in the environment may be configured in a variety of ways as will be understood by those skilled in the art without departing from the spirit or scope of aspects of the subject matter described herein.

Figure 4:
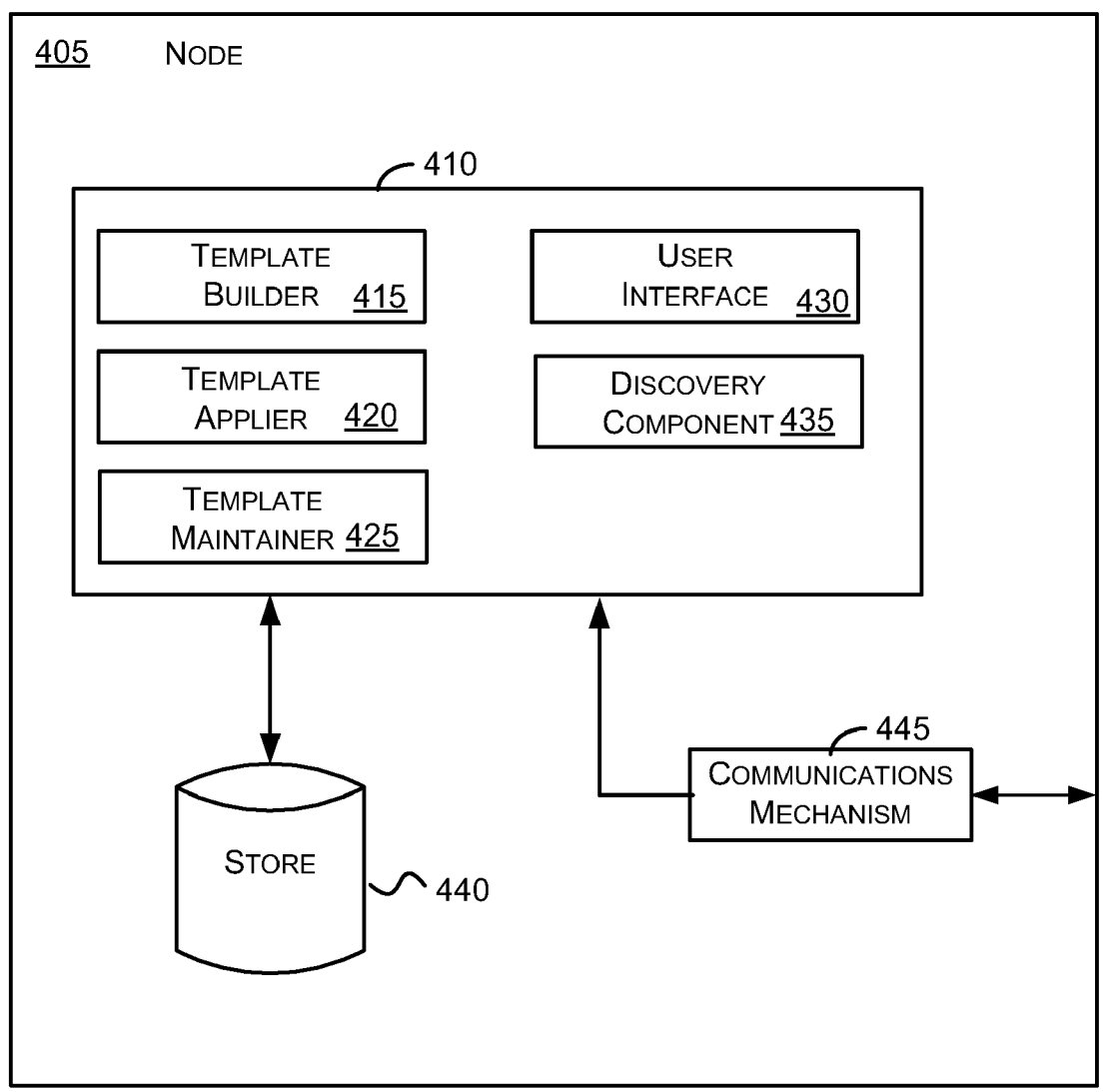
FIG. 4 is a block diagram that represents an apparatus configured in accordance with aspects of the subject matter described herein.

FIG. 4 is a block diagram that represents an apparatus configured in accordance with aspects of the subject matter described herein. The components illustrated in FIG. 4 are exemplary and are not meant to be all-inclusive of components that may be needed or included. In other embodiments, the components and/or functions described in conjunction with FIG. 4 may be included in other components (shown or not shown) or placed in subcomponents without departing from the spirit or scope of aspects of the subject matter described herein. In some embodiments, the components and/or functions described in conjunction with FIG. 4 may be distributed across multiple devices.

Turning to FIG. 4, the node 405 may include share components 410, a store 440, a communications mechanism 445, and other components (not shown). The node 405 may be implemented on or as a computer (e.g., as the computer 110 of FIG. 1).

The share components 410 correspond to the share components 225-231 of FIG. 2. The share components 410 may include a template builder 415, a template applier 420, a template maintainer 425, a user interface 430, a discovery component 435, and other components (not shown).

The communications mechanism 445 allows the node 405 to communicate with other entities (e.g., the entities 206-211 of FIG. 2). The communications mechanism 445 may be a network interface or adapter 170, modem 172, or any other mechanism for establishing communications as described in conjunction with FIG. 1.

The store 440 is any storage media capable of storing data may store the templates and other configuration data described previously. The store provides access to one or more templates. As mentioned previously, a template may potentially include a reference to another template to use in conjunction with applying the template to a share.

The template builder 415 may be used to create and update templates. In creating a template, the template builder 415 may work with the user interface 430 to receive a selection of policies and relationships with other templates from a user. Through the user interface 430, the user may indicate a hierarchy of a template that defines inheritance features one or more templates. The template builder 415 may resolve conflicts, if any, when policies from two or more templates are combined.

The template applier 420 is operable to send configuration instructions corresponding to one or more policies to one or more components responsible for applying policies to a share. Configuration instructions may include opaque data, actions, properties, and the like needed by the components to correctly apply policies to a share.

The template maintainer 425 is operable to send additional configuration instructions to the one or more components in response to a template change, a change to template to which the template refers, or a change to a template upon which the template depends. The additional configuration instructions indicating actions to take to re-configure the one or more shares in accordance with the template as changed.

The template maintainer 425 may obtain knowledge of shares associated with a template via the store 440 or via the discovery component 435. The discovery component 435 is operable to determine whether policies applied to a share match policies of a template in the store 440 based on a signature of the policies applied to the share and a signature of the template in the store 440.

The user interface 430 is operable to receive an indication of a template and one or more shares to associate with the template. The user interface 430 may then cause an association between the first template and the one or more shares to be stored (e.g., a row in a table) in the store 440. The user interface 430 may also be used to create and update templates and also be used to select templates to apply to one or more shares. In one embodiment, the user interface may operate to display a list of one or more pre-defined templates available to configure a private share and to receive an indication of a selected template. The user interface 430 may then provide the indication to a component responsible for applying the selected template to the private share.

Figure 5:
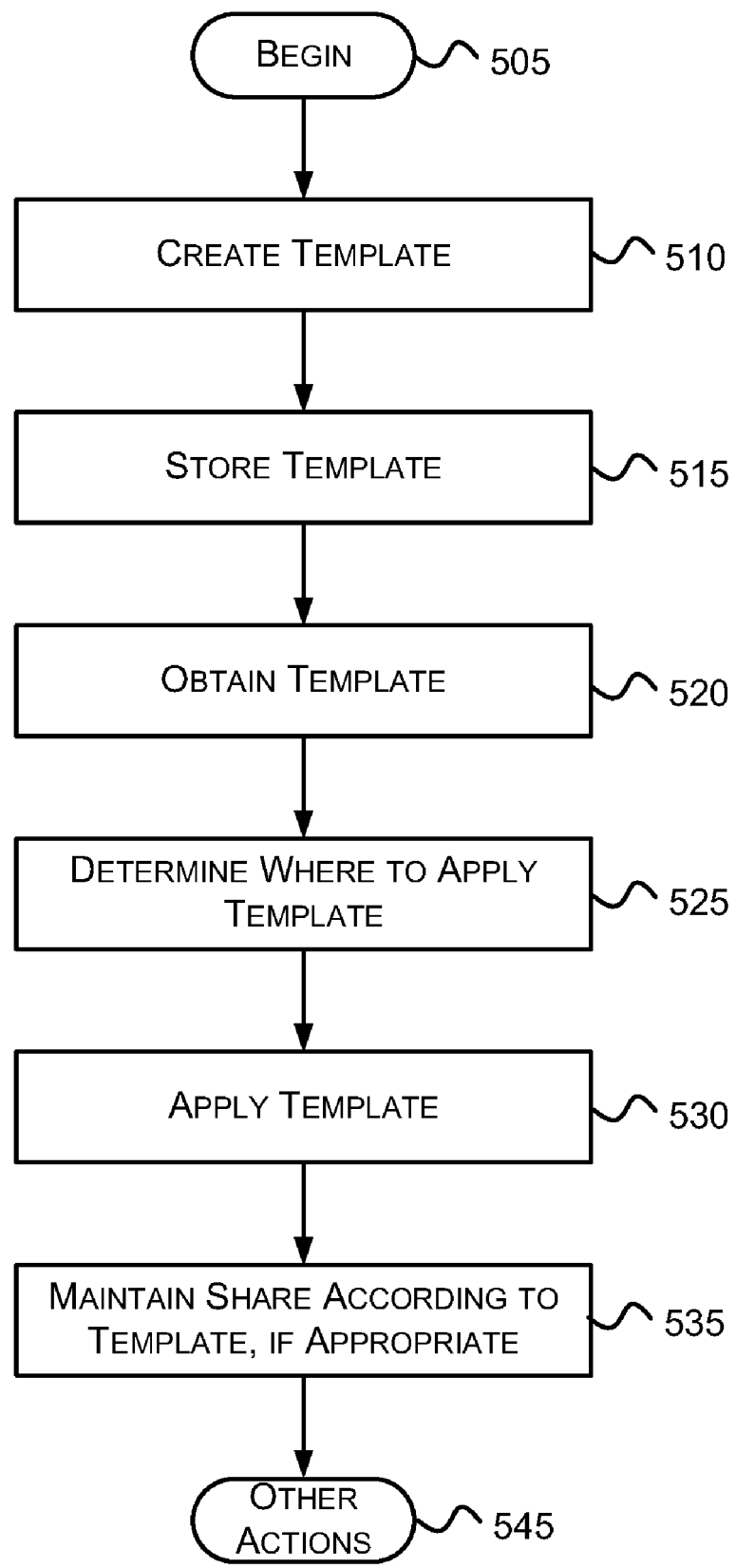
FIG. 5 is a flow diagram that generally represents exemplary actions that may occur creating and applying a template to a share in accordance with aspects of the subject matter described herein.
Figure 6:
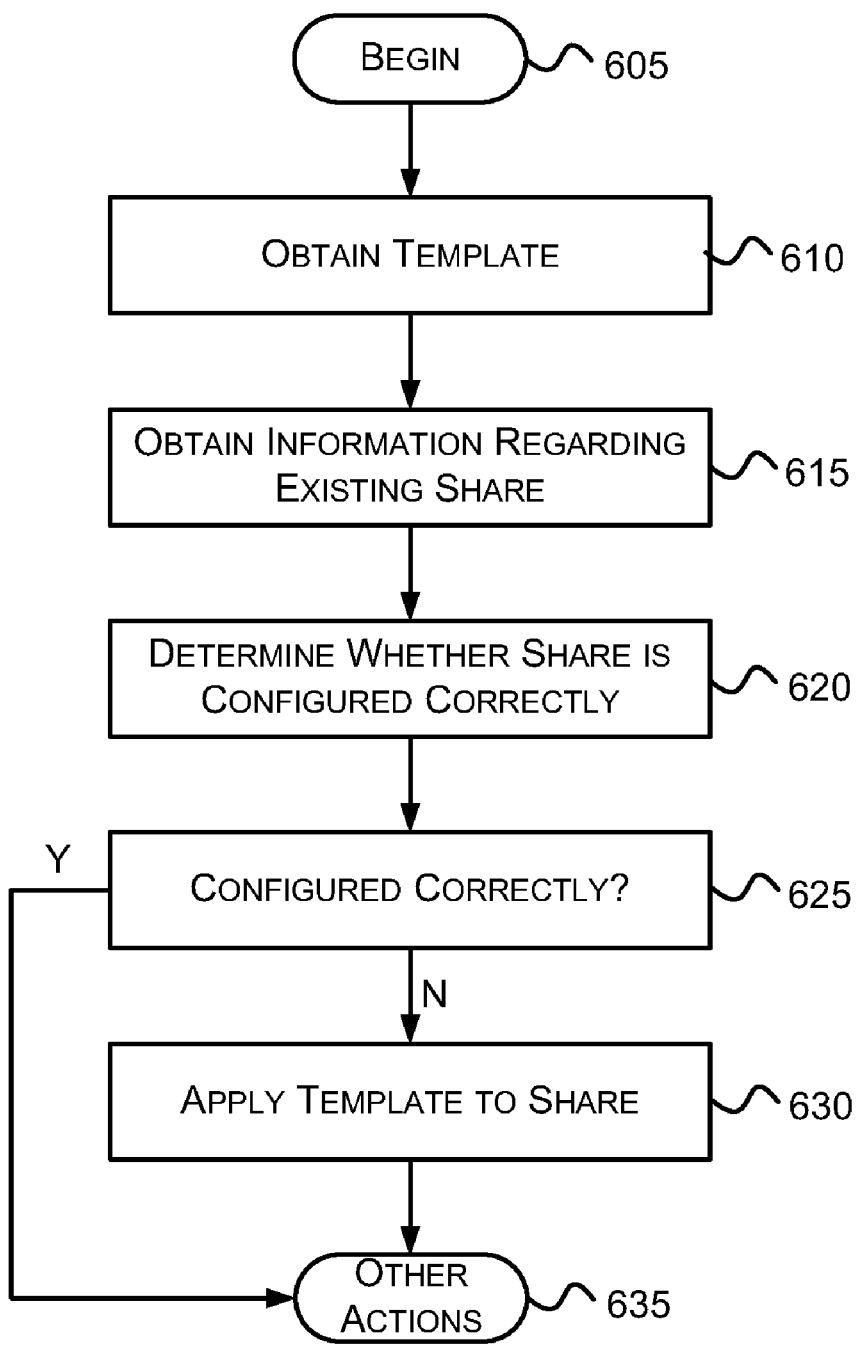
FIG. 6 is a flow diagram that generally represents exemplary actions that may occur in preparing a database to become part of a synchronization topology in accordance with aspects of the subject matter described herein.

FIGS. 5-6 are flow diagrams that generally represent actions that may occur in accordance with aspects of the subject matter described herein. For simplicity of explanation, the methodology described in conjunction with FIGS. 5-6 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

FIG. 5 is a flow diagram that generally represents exemplary actions that may occur creating and applying a template to a share in accordance with aspects of the subject matter described herein. Turning to FIG. 5, at block 505, the actions begin.

At block 510, a template is created. For example, referring to FIG. 4, the user interface 430 and the template builder may be used to create a template. The template may include a reference to a second template to use in conjunction with applying policies of the template. Templates may be associated via a hierarchy that defines inheritance for the templates. The hierarchy may indicate what templates derive properties from other templates.

At block 515, the template is stored. For example, referring to FIG. 4, data corresponding to the template may be stored in the store 440.

At block 520, the template is obtained. For example, referring to FIG. 4, data corresponding to the template may be retrieved from the store 440. When a template is obtained by a user that seeks to apply the template to a private share, if the template indicates that the template or properties of the template are restricted to authorized entities, a user interface may restrict change access to certain properties of the template to authorized entities. This may be done, for example, to ensure that the user cannot change some properties that are set by a system administrator.

As mentioned previously, to enforce organization policies, a system administrator or the like may provide one or more approved templates by which users may set up private shares. When this is indicated, a user interface may enforce the organization policy by displaying the list of approved templates and disabling other share mechanisms, if any.

At block 525, a determination is made as to the shares to which to apply the template. For example, referring to FIG. 3, the user interface 310 may be used to indicate at least one share to which to apply the template.

At block 530, the template is applied to the determined shares. For example, referring to FIG. 3, the template applier 315 applies the template to the determined shares. This may involve, for example, sending configuration instructions to one or more components responsible for applying the policies of the template to the shares. For example, referring to FIG. 2, configuration instructions may be sent to one or more of the share components 226-231 of FIG. 2.

At block 535, the share is maintained according to the template if appropriate. As mentioned previously, some templates may be configured to be used for setting up shares but not for maintaining the shares while other templates may be configured to set up and/or maintain shares. For example, referring to FIG. 4, if a change occurs to a template or another template, if any, that the template references or upon which the template depends, the template maintainer 425 may reconfigure any shares associated with the template.

At block 535, other actions, if any, may be performed.

FIG. 6 is a flow diagram that generally represents exemplary actions that may occur in maintaining a share according to a template in accordance with aspects of the subject matter described herein. Turning to FIG. 6, at block 605, the actions begin.

At block 610, the template is obtained. For example, referring to FIG. 4, data corresponding to the template may be retrieved from the store 440.

At block 615, information regarding at least one existing share is obtained. For example, referring to FIG. 3, a share associated with the template is determined via information in the store 307. This information is used to query share components that can obtain information about policies applied to the share. These share components can then forward this information to a maintainer so that the maintainer may determine whether the share is configured correctly.

At block 620, a determination is made as to whether the share is configured in accordance with the template. For example, referring to FIG. 4, the template maintainer 425 may determine whether the share is configured according to policies included in the template.

At block 625, if the share is configured correctly, actions may continue at block 635; otherwise, actions may continue at block 630.

At block 630, the template is applied to the share. This may involve sending only those policies that are needed to configure the share correctly or sending all policies included in a template and having share components apply the policies to configure the share in accordance with the policies.

At block 635, other actions, if any, are performed.

As can be seen from the foregoing detailed description, aspects have been described related to configuring file shares. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method implemented at least in part by a computer, the method comprising:

obtaining a first template to apply to one or more shares for configuring the one or more shares, the one or more shares including one or more file system objects, the first template including one or more policies, and a reference to a second template for use in conjunction with configuring the one or more shares, the one or more policies being indicated by one or more properties of the first template, the one or more policies including at least one policy having data that is opaque to a first component but understood by a second component;

the first component passing the data that is opaque to the first component to the second component for interpretation, wherein the second component applies the first template to the one or more shares;

receiving an indication of at least one share of the one or more shares to which the first template is to be applied;

applying the first template to configure the at least one share in accordance with the one or more policies; and automatically re-configuring the at least one share when one or more changes occur in the first template, or in any other template that the first template references, or in any other template on which the first template depends.

2. The method of claim 1, further comprising determining using a property of the one or more properties of the first template whether to give access to the first template to an entity that seeks to apply the first template to configure the one or more shares.

3. The method of claim 1, further comprising creating the first template from two or more other templates.

4. The method of claim 3, wherein creating the first template from two or more other templates comprises deriving properties from the two or more other templates, the two or more other templates associated with the first template via a hierarchy of templates that defines inheritance for the templates.

5. The method of claim 3, wherein creating the first template from two or more other templates comprises performing one or more of a union and intersection of two or more properties of the two or more other templates.

6. The method of claim 1, further comprising displaying a default value of at least one property of the one or more properties, of the first template, receiving input from a user interface, and changing the value of the at least one property in accordance with the input.

7. The method of claim 1, further comprising restricting access to at least one property of the one or more properties of the first template to authorized entities.

8. The method of claim 1, further comprising enforcing at least one policy which indicates that users are not allowed to create shares except through an approved template.

9. The method of claim 1, further comprising applying the second template to further configure the at least one share in accordance with the second template.

10. A computer storage medium storing computer-executable instructions, which when executed perform actions, comprising:
obtaining a first template for configuring one or more shares, the one or more shares including one or more file system objects, the first template including one or more policies for applying to one or more shares, and a reference to a second template for use in conjunction with applying the one or more policies, the one or more policies including at least one policy having data that is opaque to a first component but understood by a second component;
passing the data that is opaque to the first component to the second component for interpretation, wherein the second component applies the first template to the one or more shares;
obtaining information regarding at least one existing share;
determining that the at least one existing share is not configured in accordance with the first template;
applying the first template to configure the at least one existing share in accordance with the first template; and
automatically re-configuring the at least one existing share when one or more changes occur in the first template, or in any other template that the first template references, or in any other template on which the first template depends.

11. The computer storage medium of claim 10, wherein obtaining information regarding the at least one existing share comprises obtaining information from a record in a store, the record associating the at least one existing share with the first template, the record indicating a location of the at least one existing share.

12. The computer storage medium of claim 10, wherein obtaining information regarding the at least one existing share comprises determining a set of policies applied to the at least one existing share and matching the set of policies with the one or more policies included in the first template.

13. The computer storage medium of claim 10, further comprising performing a change on the first template, or another template that the first template references, or a template upon which the first template depends, wherein determining that the at least one existing share is not configured in accordance with the first template is done in response to performing the change.

14. The computer storage medium of claim 10, wherein applying the template to configure the at least one existing share in accordance with the first template comprises passing opaque data indicated by the first template to a component to configure a policy on the existing share using the opaque data, the opaque data being understood only by the component.

15. In a computing environment, an apparatus, comprising:
a template store that provides access to a first template for configuring one or more shares, the one or more shares including one or more file system objects, the first template including one or more policies, and a reference to a second template for use in conjunction with configuring the one or more shares, the one or more policies including at least one policy having opaque data, wherein the opaque data is understood by one or more components to which the opaque data is sent;
a user interface that receives an indication of the first template and the one or more shares and stores an association between the first template and the one or more shares; and
a template applier that sends configuration instructions including the opaque data corresponding to the one or more policies to the one or more components, for applying the one or more policies to the one or more shares for configuring the one or more shares, the opaque data being understood by the one or more components but not being understood by the template applier.

16. The apparatus of claim 15, further comprising a discovery component that determines whether policies applied to a share match policies of a template in the template store based on a signature of the policies applied to the share and a signature of the template in the template store.

17. The apparatus of claim 15, further comprising a template maintainer that automatically sends additional configuration instructions to the one or more components when the first template changes, or a template to which the first template refers changes, or a template upon which the first template depends changes, the additional configuration instructions indicating actions to take to re-configure the one or more shares in accordance with the changed template.

18. The apparatus of claim 15, wherein the user interface further displays a list of one or more templates available to configure a private share, to receive an indication of a selected template, and to provide the indication to a component that applies the selected template to the private share.

19. The method of claim 3, wherein creating the first template from two or more other templates comprises retaining a first combination of properties of the two or more other templates and discarding a second combination of the properties of the two or more other templates.

20. The apparatus of claim 15, further comprising a tool that resolves any conflicts when a property in one template conflicts with another property in another template.

* * * * *